(12) United States Patent
Franco

(10) Patent No.: US 7,377,210 B1
(45) Date of Patent: May 27, 2008

(54) GREASE RECEIVING AND HOLDING SYSTEM

(76) Inventor: Geno A. Franco, 5009 Durley Dr., Salida, CA (US) 95368

( * ) Notice: Subject to any disclaimer, the term of this patent is extended or adjusted under 35 U.S.C. 154(b) by 607 days.

(21) Appl. No.: 11/002,915

(22) Filed: Dec. 3, 2004

(51) Int. Cl.
*B65B 1/06* (2006.01)

(52) U.S. Cl. ............................ 99/446; 99/400; 141/340; 210/474; 210/477; 4/654

(58) Field of Classification Search .................. 99/446, 99/400; 4/654, 657; 141/340, 341, 342, 141/98, 285; 210/538, 540, 474, 477; 137/833, 137/861
See application file for complete search history.

(56) References Cited

U.S. PATENT DOCUMENTS

| | | | |
|---|---|---|---|
| 2,353,993 A * | 7/1944 | Cavicchioli | ...................... 4/629 |
| 4,472,277 A | 9/1984 | Bailey et al. | |
| 4,909,137 A | 3/1990 | Brugnoli | |
| 5,086,619 A * | 2/1992 | Huang et al. | ................. 62/50.1 |
| 5,492,619 A | 2/1996 | Batten | |
| 5,713,265 A | 2/1998 | Strader et al. | |
| 5,823,097 A | 10/1998 | Dirck | |
| 5,832,810 A | 11/1998 | Brawley, Sr. et al. | |
| 7,137,419 B1 * | 11/2006 | Reeves | ........................ 141/340 |

* cited by examiner

*Primary Examiner*—Reginald L Alexander

(57) ABSTRACT

A grease receiving and holding system includes a sink that has a peripheral flange having an opening extending therethrough. A housing is mounted below a plane of the peripheral flange. The housing has a bottom wall, a top wall and a peripheral wall extending between and is attached to the top and bottom walls. A pipe has a first end and a second end. The first end is fluidly coupled to the housing. A funnel is fluidly attached to the second end of the pipe. The funnel has an upper edge that has a diameter that is substantially equal to a diameter of the opening. A peripheral lip is attached to and extends around the upper edge. The peripheral lip is abuttable against the flange when the funnel is positioned in the opening. Grease may be poured down the funnel and into the housing.

10 Claims, 3 Drawing Sheets

GREASE RECEIVING AND HOLDING SYSTEM

BACKGROUND OF THE INVENTION

1. Field of the Invention

The present invention relates to grease holding devices and more particularly pertains to a new grease holding device for holding and storing used grease until its disposal.

2. Description of the Prior Art

The use of grease holding devices is known in the prior art. U.S. Pat. No. 5,832,820 describes a grease holding container that is fluidly coupled to a frying tub. Another such device is U.S. Pat. No. 5,823,097. A similar device is found in U.S. Pat. No. 4,472,277 which describes a grease trap for separating water and grease. U.S. Pat. No. 4,909,137 shows a device that uses a funnel for catching grease floating on an upper surface of water positioned in a sink. The funnel is fluidly coupled to a container for storing the grease skimmed off of the water. The grease may then be disposed of as desired.

While these devices fulfill their respective, particular objectives and requirements, the need remains for a device that may be used for holding and storing large amounts of grease, after it has been used for cooling or created as a byproduct of cooking, so that it may be disposed of when convenient and without danger of the grease traveling down a sink drain.

SUMMARY OF THE INVENTION

The present invention meets the needs presented above by generally comprising a sink that has a peripheral flange having an opening extending therethrough. A housing is mounted below a plane of the peripheral flange of the sink. The housing has a bottom wall, a top wall and a peripheral wall extending between and is attached to the top and bottom walls. A pipe has a first end and a second end. The first end is fluidly coupled to the housing. A funnel is fluidly attached to the second end of the pipe. The funnel has an upper edge that has a diameter that is substantially equal to a diameter of the opening. A peripheral lip is attached to and extends around the upper edge. The peripheral lip is abuttable against the flange when the funnel is positioned in the opening. Grease may be poured down the funnel and into the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
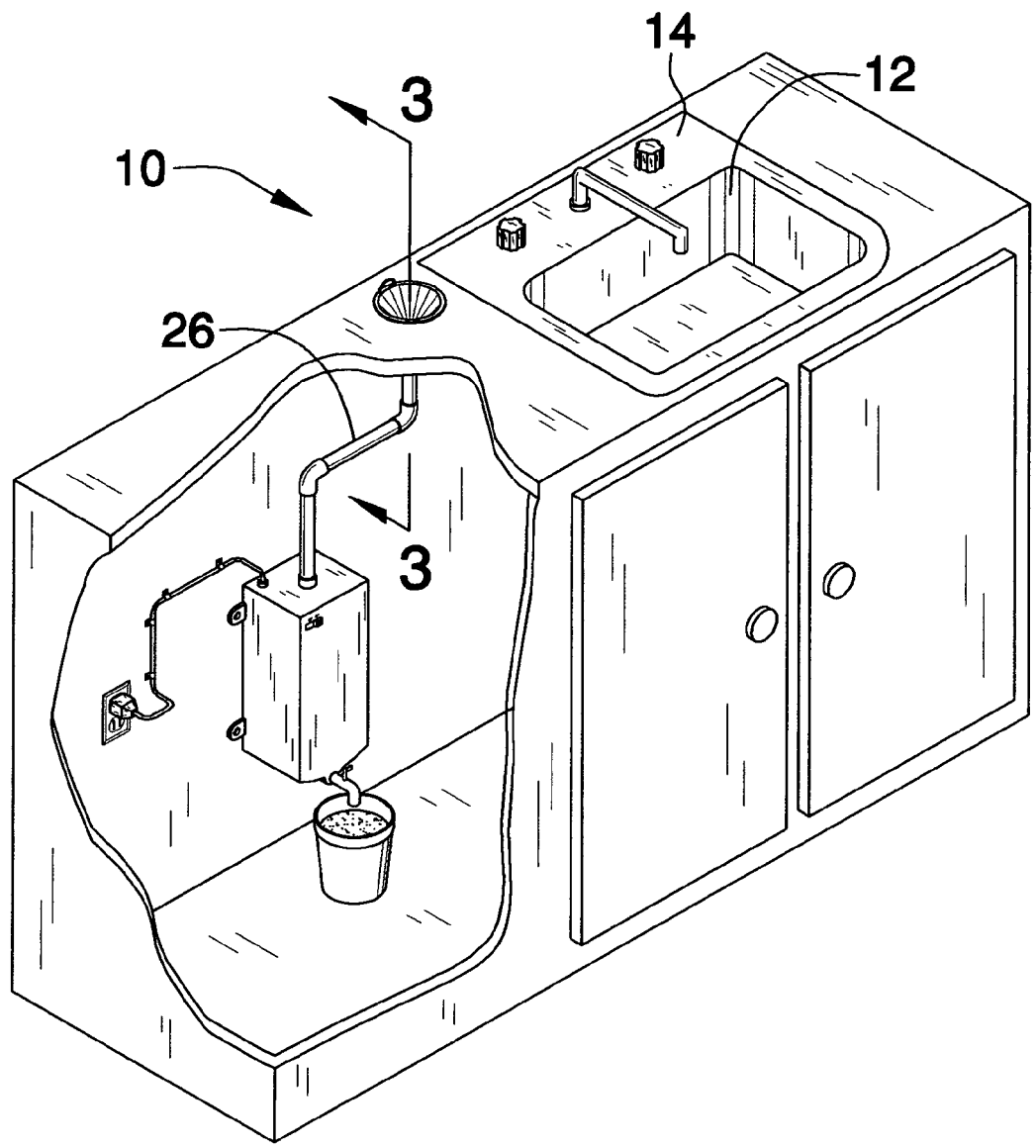
FIG. 1 is a perspective view of a grease receiving and holding system according to the present invention.
Figure 2:
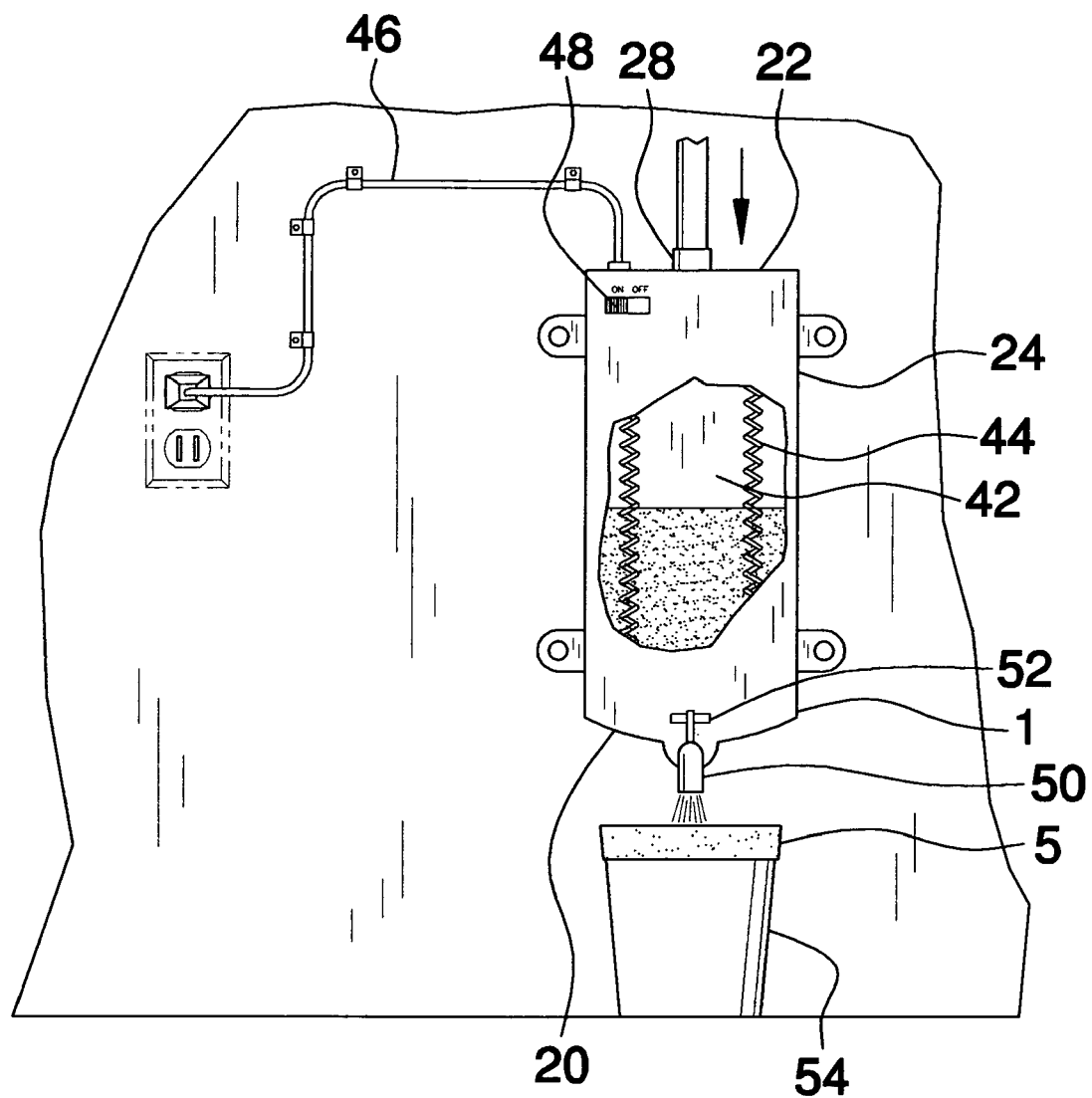
FIG. 2 is a front view of the present invention.
Figure 3:
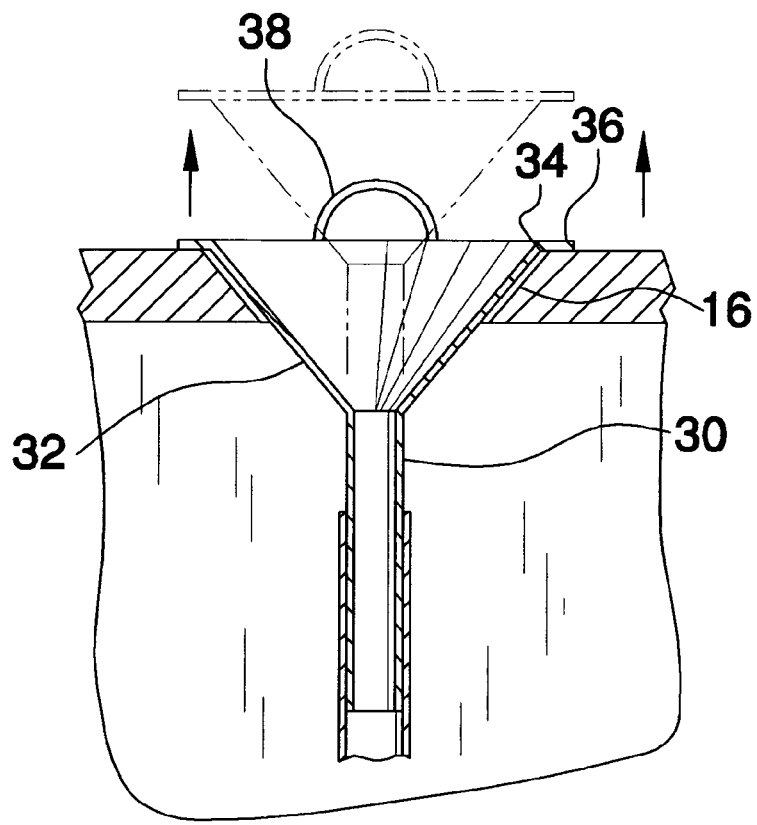
FIG. 3 is an enlarged view of a funnel of the present invention.
Figure 4:
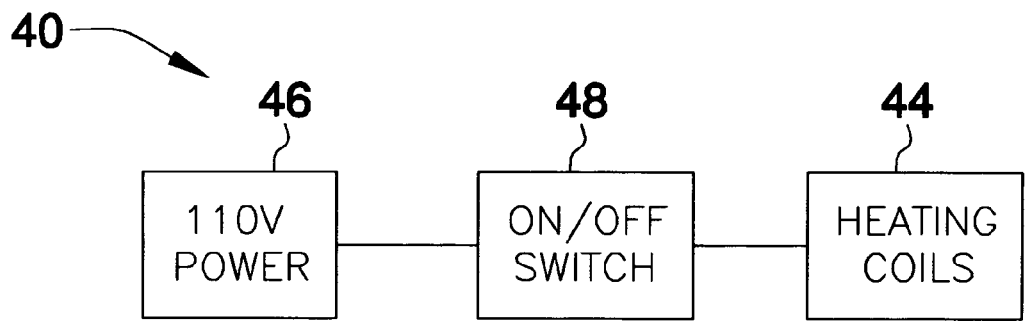
FIG. 4 is a schematic view of the present invention.

With reference now to the drawings, and in particular to FIGS. 1 through 4 thereof, a new grease holding device embodying the principles and concepts of the present invention and generally designated by the reference numeral 10 will be described.

As best illustrated in FIGS. 1 through 4, the grease receiving and holding system 10 generally comprises a conventional sink 12 that has a peripheral flange 14. The peripheral flange 14 has an opening 16, extending therethrough.

A housing 18 is mounted below a plane of the peripheral flange of the sink 12, such as within a cabinet holding the sink 12. The housing 18 has a bottom wall 20, a top wall 22 and a peripheral wall 24 extending between and is attached to the top 22 and bottom 20 walls. A pipe 26 has a first end 28 and a second end 30. The first end 28 is fluidly coupled to the housing 18 and more preferably to the top wall 22 of the housing 18. The second end 30 is positioned adjacent to the opening 16. The pipe 26 is selectively telescoping, particularly adjacent to the second end 30.

A funnel 32 is fluidly attached to the second end 30 of the pipe 26. The funnel 32 has an upper edge 34 that has a diameter is substantially equal to a diameter of the opening 16. A peripheral lip 36 is attached to and extends around the upper edge 34. The peripheral lip 36 is abuttable against the flange 14 when the funnel 32 is positioned in the opening to define a stored position. The lip 36 is selectively abuttable against or positionable above the flange 14. A grip 38 is attached to the peripheral lip 36 to aid a person in lifting the funnel 32 upwardly from the sink 12 to aid in its usage.

A heating assembly 40 is in communication with an interior 42 of the housing 18 for selective heating the interior 42. The heating assembly 40 includes at least one conventional heating conduit 44 positioned within the housing 18. The heating conduit 44 is ideally comprised of heating coils that are electrically insulated. A power supply 46 electrically coupled to the heating conduit 44. The power supply 46 may include a conventional power cord. An actuator 48 is electrically coupled to the power supply 46 for selectively turning the power supply 46 on or off.

A drainpipe 50 is fluidly coupled to the housing 18. A valve 52 is fluidly coupled to the drainpipe 50 for selectively opening or closing the drainpipe 50. The drainpipe 50 is positioned generally adjacent to the bottom wall 20 of the housing 18.

In use, grease may be poured down the funnel 32 and into the housing 18. This procedure is made easier by allowing a person to pull the funnel 32 upwardly away from the sink 12. The grease is stored in the housing 18 where it may begin to solidify. When a person wishes to empty the housing 18, the heating assembly 40 is turned on liquefy the grease and the valve 52 is opened to pour the grease out of the housing 18 and into a container 54. A removably liner 56 may be provided with the container 54 so that the container 54 does not need to be cleaned after its use.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A grease storage system comprising:
   a sink having a peripheral flange having an opening extending therethrough;
   a housing being mounted below a plane of said peripheral flange of said sink, said housing having a bottom wall, a top wall and a peripheral wall extending between and being attached to said top and bottom walls;
   a pipe having a first end and a second end, said first end being fluidly coupled to said housing;
   a funnel being fluidly attached to said second end of said pipe, said funnel having an upper edge having a diameter being substantially equal to a diameter of said opening, a peripheral lip being attached to and extending around said upper edge, said peripheral lip being abuttable against said flange when said funnel is positioned in said opening;
   said pipe being selectively telescoping such that said lip may be selectively abuttable against or positionable above said flange; and
   wherein grease may be poured down said funnel and into said housing.

2. The system according to claim 1, further including a grip being attached to said peripheral lip.

3. The system according to claim 1, a heating assembly being in communication with an interior of said housing for selective heating said interior.

4. The system according to claim 3, wherein said heating assembly includes;
   at least one heating conduit positioned within said housing;
   a power supply electrically coupled to said heating conduit; and
   an actuator electrically coupled to the power supply for selectively turning said power supply on or off.

5. The system according to claim 3, further including a drainpipe being fluidly coupled to said housing, a valve being fluidly coupled to said drainpipe for selectively opening or closing said drainpipe, said drainpipe being positioned generally adjacent to said bottom wall of said housing.

6. A grease storage system comprising:
   a sink having a peripheral flange having an opening extending therethrough;
   a housing being mounted below a plane of said peripheral flange of said sink, said housing having a bottom wall, a top wall and a peripheral wall extending between and being attached to said top and bottom walls;
   a pipe having a first end and a second end, said first end being fluidly coupled to said housing, said pipe being selectively telescoping;
   a funnel being fluidly attached to said second end of said pipe, said funnel having an upper edge having a diameter being substantially equal to a diameter of said opening, a peripheral lip being attached to and extending around said upper edge, said peripheral lip being abuttable against said flange when said funnel is positioned in said opening, said lip being selectively abuttable against or positionable above said flange;
   a grip being attached to said peripheral lip;
   a heating assembly being in communication with an interior of said housing for selective heating said interior, said heating assembly including;
      at least one heating conduit positioned within said housing;
      a power supply electrically coupled to said heating conduit;
      an actuator electrically coupled to the power supply for selectively turning said power supply on or off;
   a drainpipe being fluidly coupled to said housing, a valve being fluidly coupled to said drainpipe for selectively opening or closing said drainpipe, said drainpipe being positioned generally adjacent to said bottom wall of said housing; and
   wherein grease may be poured down said funnel and into said housing.

7. A grease storage system comprising:
   a sink having a peripheral flange having an opening extending therethrough;
   a housing being mounted below a plane of said peripheral flange of said sink, said housing having a bottom wall, a top wall and a peripheral wall extending between and being attached to said top and bottom walls;
   a pipe having a first end and a second end, said first end being fluidly coupled to said housing;
   a funnel being fluidly attached to said second end of said pipe, said funnel having an upper edge having a diameter being substantially equal to a diameter of said opening, a peripheral lip being attached to and extending around said upper edge, said peripheral lip being abuttable against said flange when said funnel is positioned in said opening;
   a heating assembly being in communication with an interior of said housing for selective heating said interior; and
   wherein grease may be poured down said funnel and into said housing.

8. The system according to claim 7, wherein said pipe is selectively telescoping such that said lip may be selectively abuttable against or positionable above said flange, a grip being attached to said peripheral lip.

9. The system according to claim 7, wherein said heating assembly includes;
   at least one heating conduit positioned within said housing;
   a power supply electrically coupled to said heating conduit; and
   an actuator electrically coupled to the power supply for selectively turning said power supply on or off.

10. The system according to claim 7, further including a drainpipe being fluidly coupled to said housing, a valve being fluidly coupled to said drainpipe for selectively opening or closing said drainpipe, said drainpipe being positioned generally adjacent to said bottom wall of said housing.

* * * * *